(No Model.)
P. A. SPICER.
SPRING HARROW TOOTH HOLDER.
No. 369,037. Patented Aug. 30, 1887.
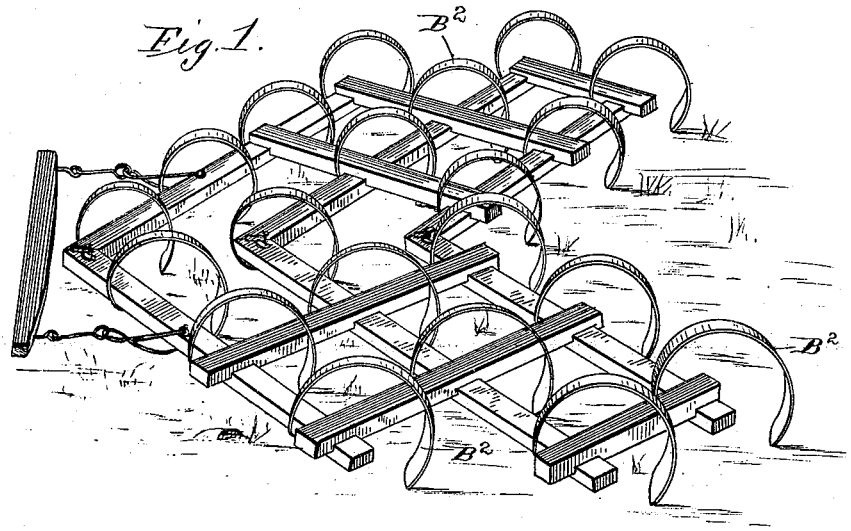
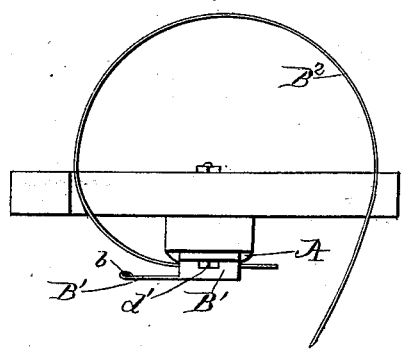
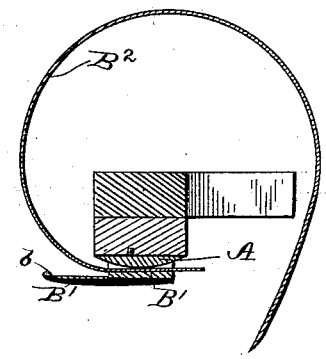
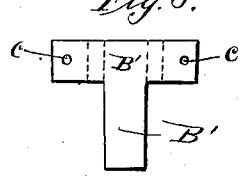
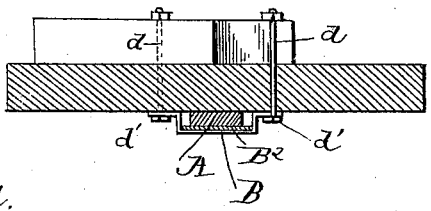
Witnesses:
Ira R. Steward.
W. L. Boyden.
Pratt A. Spicer.
Inventor:—
By Chas. E. Barber
His atty. in fact.

UNITED STATES PATENT OFFICE.

PRATT A. SPICER, OF MARSHALL, MICHIGAN.

SPRING HARROW-TOOTH HOLDER.

SPECIFICATION forming part of Letters Patent No. 369,037, dated August 30, 1887.

Application filed April 19, 1887. Serial No. 235,376. (No model.)

*To all whom it may concern:*

Be it known that I, PRATT A. SPICER, a citizen of the United States, residing at Marshall, in the county of Calhoun and State of Michigan, have invented certain new and useful Improvements in Spring Harrow-Tooth Holders, of which the following is so full, clear, and exact a description as will enable others skilled in the art to which my invention appertains to make and use the same, reference being had to the accompanying drawings, in which—

Figure 1 is a perspective of a harrow embodying my invention. Fig. 2 is a detail of the same. Fig. 3 is a cross-section of Fig. 2. Fig. 4 is a longitudinal section of the same. Fig. 5 is a plan view of the holder-blank.

The object of my invention is to provide a holder which will not become quickly worn and allow the teeth to work loose.

Another object of my invention is to provide a holder which will serve as a runner for the harrow to prevent the teeth from running too deep into the ground, which causes the harrow-frame to drag and load with earth, making the work very hard for the horses.

Another object of my invention is to construct a harrow-tooth holder which will relieve the teeth from a portion of the wear incident to harrow-teeth of this kind, and this is effected by presenting a runner-surface to the earth and forming the holder in the shape of a shoe, to prevent the harrow also from running too heavy.

Another object of my invention is to construct a harrow-tooth holder which will facilitate the ready and easy adjustment of the teeth to different lengths when it is desired to run them at varying depths.

By the use of my device the tooth is fastened firmly to the harrow in a manner much more secure than any of the devices now in use, and my device is at the same time very convenient to use in adjusting the teeth to different lengths and angles.

In the construction of my holder I form a piece of wood or cast a piece of iron, A, convex on its lower side to fit into and be encircled by the concave portion of the tooth $B^2$. The opposite side of the block A is flat where it comes into contact with the timber of the harrow-frame, and it may be provided with a short dowel-pin, $a$, to go into the frame of the harrow. To form the holder B, I take a piece of steel and cut it into a blank, (shown in Fig. 5,) and drop-forge it into the desired shape, having the end $b$ turned under, as shown in Fig. 2. This blank is provided with two holes, $c\ c$, to receive the bolts $d\ d$, which extend through from the bottom of the harrow and are provided with nuts $d'\ d'$. By loosening the nuts $d'\ d'$ until the holder can be slightly raised, the teeth can be readily moved endwise to adjust the depth that the harrow will pulverize the ground.

The holder or cap proper, B, is so flat and large that it acts as a runner to hold the harrow at the right distance from the ground, or to hold the harrow-teeth at a proper distance from the surface of the ground to prevent their running too deep in all conditions of soil. This also prevents the wearing of the frame, as the main part of the wear comes directly on a part of the runner or holder B. These steel caps are inexpensive and are easily removed and replaced when worn out. They might also be made of wrought-iron or of malleable iron, or, if made of a sufficient weight, they could be made of cast-iron as well.

A feature of prime importance of my invention consists of the caps projecting some ways forward in the shape of a neck or shoe, B', having its outer end turned under to relieve it of any sharp point or ragged edge or ends, which will catch stubble or grass as it runs through the field.

Another important feature of my invention is that the projecting end B' serves as a stop to limit the upper movement of the tooth when its end is caught by a stone or other obstruction—such as a root or stump—which will spring the tooth to such an extent that in some instances it is broken off close to the holder.

By the use of a cap constructed in accordance with my invention the projecting end B', while it acts as a runner, does not turn up quite as much as the curve of the tooth, and as a natural consequence when the tooth is strained or straightened almost to the breaking-point it comes into contact with the front end of the runner B' on the end of the cap, which forms a stop, and the strain is relieved to such an extent as to positively prevent the tooth from breaking. The abutting of the end B' of the holder against the tooth will cause it to curve in an opposite direction back of the end of the projection B', which will allow the outer end of the tooth to straighten out horizontally, and thus clear the obstruction over which the harrow is passing.

When it is desired to remove a tooth or to readjust the teeth of the harrow to any desired angle or depth, the nuts $d'$ $d'$ are slightly loosened, which will allow the teeth to be slipped back and forth freely through the holder, and it may be secured in any desired position by tightening the nuts again.

Several minor details of the construction of my device may be varied without departing from the spirit of my invention, and I do not wish to be understood as limiting myself to the precise construction shown.

Having now described the objects, uses, and advantages of my device, what I desire to secure by Letters Patent, and what I therefore claim, is—

1. In a harrow-tooth holder of the character described, the combination of the main holder having a projecting lip provided with a stop, $b$, which holder serves the double purpose of a runner for the harrow and a guard and stop to prevent the wearing and accidental breaking of the harrow-teeth, substantially as and for the purposes specified.

2. In a harrow-tooth of the character described, the combination of the elongated holder having a free rib or blunted projection at its outer elongated end, substantially as and for the purposes specified.

In testimony that I claim the above as my invention I hereunto set my hand in the presence of two subscribing witnesses.

PRATT A. SPICER.

Witnesses:
ELIAS HEWITT,
IRVING UDELL.